(12) United States Patent
Ougouag et al.

(10) Patent No.: US 7,403,585 B2
(45) Date of Patent: Jul. 22, 2008

(54) OPTIMALLY MODERATED NUCLEAR FISSION REACTOR AND FUEL SOURCE THEREFOR

(75) Inventors: Abderrafi M. Ougouag, Idaho Falls, ID (US); William K. Terry, Shelley, ID (US); Hans D. Gougar, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 173 days.

(21) Appl. No.: 10/884,341

(22) Filed: Jul. 1, 2004

(65) Prior Publication Data

US 2006/0002503 A1    Jan. 5, 2006

(51) Int. Cl.
*G21C 19/28* (2006.01)
(52) U.S. Cl. .................. 376/381; 376/382; 376/355
(58) Field of Classification Search ................ 376/381, 376/382, 383, 458, 355
See application file for complete search history.

(56) References Cited

U.S. PATENT DOCUMENTS

| | | | | |
|---|---|---|---|---|
| 2,798,847 A | * | 7/1957 | Fermi et al. | 376/219 |
| 3,046,212 A | * | 7/1962 | Anderson | 376/355 |
| 4,293,380 A | * | 10/1981 | Robbins | 376/209 |
| 5,202,085 A | * | 4/1993 | Aoyama et al. | 376/435 |

OTHER PUBLICATIONS

Gougar, "Advanced Core Design and Fuel Management for Pebble-Bed Reactors", Thesis presented to the Pennsylvania State University, Graduate School Department of Mechanical and Nuclear Engineering, May 2004.*

Ougouag, Development of Advanced Methods for Pebble-Bed Reactor Neutronics: DEsign, Analysis, and Fuel Cycle Optimization, Nuclear Energy Research Initiative, 2002 Annual Report, pp. 197-199.*

MacDonald, "Next Generation Nuclear Plant (NGNP), A Very High Temperature Gas-cooled Reactor (VHTR)", Advanced Reactor, Fuel Cycle, and Energy Products Workshop for Universities, Hilton Hotel, Gaithersburg, MD, Mar. 4-5, 2004); neri.inel.gov/universities_workshop/proceedings/pdfs/ngnp.pdf, accessed Jan. 30, 2007.*

Ortiz et al. , "Using a multi-state recurrent neutral network to optimize loading patterns in BWRs", Annals of Nuclear Energy, vol. 31, Issue 7, May 2004, pp. 789-803.*

Kadak et al., Modular Pebble Bed Reactor Project, University Research Consortium Annual Report (Jul. 2000).*

Terry et al., Modular Pebble Bed Reactor Project, Laboratory-Directed Research and Development Program, FY 2001 Annual Report (Dec. 2001).*

Jing Wang, "Recent Predictions on NPR Capsules by Integrated Fuel Performance Model" (Spring 2002 Fission Seminar, MIT, Jul. 19, 200).*

(Continued)

*Primary Examiner*—Rick Palabrica
(74) *Attorney, Agent, or Firm*—Bruce Dahl (57) ABSTRACT

An improved nuclear fission reactor of the continuous fueling type involves determining an asymptotic equilibrium state for the nuclear fission reactor and providing the reactor with a moderator-to-fuel ratio that is optimally moderated for the asymptotic equilibrium state of the nuclear fission reactor; the fuel-to-moderator ratio allowing the nuclear fission reactor to be substantially continuously operated in an optimally moderated state.

30 Claims, 6 Drawing Sheets

OTHER PUBLICATIONS

Southworth, et al., Next Generation Nuclear Plant (NGNP) Project—Preliminary Assessment of two possible designs, 14th Pacific Basin Conference, Mar. 21-25, 2004.*

J. Chen, "Online Burnup Monitoring of Pebble Bed ReactorFuel Using Passive Gamma-Ray Spectrometry," May 3, 2004. http://web.archive.org/web/20071028175426/http://search.isu.edu.*

Terry, W.K., Gougar, H.D., and Ougouag, A.M., "Direct Deterministic Method for Neutronics Analysis and computation of asymptotic burnup distribution in a recirculating pebble-bed reactor" *Annals of Nuclear Energy* 29 (2002) 1345-1364.

Ougouag, A.M. et al., "Optimal Moderation in the Pebble-Bed Reactor for Enhanced Passive Safety and Improved Fuel Utilization".

* cited by examiner

OPTIMALLY MODERATED NUCLEAR FISSION REACTOR AND FUEL SOURCE THEREFOR

GOVERNMENT RIGHTS

The United States Government has rights in the following invention pursuant to Contract No. DE-AC07-99ID13727 between the U.S. Department of Energy and Bechtel BWXT Idaho, LLC.

TECHNICAL FIELD

This invention relates to nuclear fission reactors in general and more specifically to nuclear fission reactors of the continuous fueling type.

BACKGROUND

Continuous fueling nuclear fission reactors differ from conventional nuclear fission reactors in that the fuel source (i.e., a fissionable material that may include any of the known fissionable isotopes, such as, but not limited to, U-235, U-233, or Pu-239, or may also contain fertile isotopes, such as, for example, U-238 or Th-232, that convert to fissile materials upon residence in an operating reactor core) is continuously provided to the reactor. In conventional or periodically fueled types, the reactor is initially provided with a fuel source or "load." The reactor is then operated until the fuel load is depleted, at which point the reactor must be shut down and refueled. One type of continuous fueling reactor is the so-called pebble bed reactor, which takes its name from the pebble-like configuration of the fuel elements comprising the fuel source or load. The fuel source of a pebble bed reactor comprises a plurality of spherical elements or "pebbles," each of which is about the size of a tennis ball. Each pebble is made up of a large number of much smaller coated fuel particles or kernels dispersed in a graphite matrix within the pebble.

A typical pebble bed reactor comprises a core formed by a plurality of the generally spherically shaped fuel elements or pebbles. The pebbles comprising the core are typically contained in a graphite reflector. A coolant, typically gaseous helium, is caused to flow through the pebble core and the graphite reflector. The pebble bed reactor is designed so that it is continuously replenished with fuel during operation. To date, three different types of continuous refueling systems have been used or proposed. In the first type of system, spent fuel pebbles are continuously extracted from the core and replaced with new fuel pebbles. The spent pebbles are usually extracted from the bottom of the core, whereas the new pebbles are provided to the top of the core. Thus, as the reactor is operated, fresh fuel pebbles located at the top of the core move steadily downward through the core as they are "burned," ultimately being removed from the bottom of the core as spent fuel pebbles.

The second type of system is similar to the first, except the pebbles removed from the bottom of the core are recycled to the top of the core, whereupon they intermix with fresh fuel pebbles that are also provided to the top of the core. This type of system may also be provided with a depletion detection system for detecting when the pebbles extracted from the core have become depleted to the extent where it is no longer desirable to recycle them. The depleted pebbles are then removed from the recycle loop.

The third type of system differs from the first two in that no fuel is ever removed from it. In this case, as fuel is depleted, fresh fuel is added on top in order to maintain a critical core. The active portion of the core gradually moves upward until there is no longer room in the reactor core vat for additional fresh fuel.

Continuous fueling reactors, such as pebble bed reactors, are advantageous in that they provide a high-temperature heat supply with a high degree of fuel burn-up. The high-temperature heat supply provided by such pebble bed reactors may be useful in its own right and also allows for electricity generation at high thermal efficiencies. Pebble bed reactors are also considerably safer in operation compared with reactors that are periodically fueled. The construction of the fuel pebbles used in pebble bed reactors also present advantages in terms of unwanted proliferation of fissionable material.

SUMMARY OF THE INVENTION

An improved nuclear fission reactor of the continuous fueling type according to one embodiment of the present invention comprises determining an asymptotic equilibrium state for the nuclear fission reactor; and providing the reactor with a moderator-to-fuel ratio that is optimally moderated for the asymptotic equilibrium state of the nuclear fission reactor, the moderator-to-fuel ratio allowing the nuclear fission reactor to be substantially continuously operated in an optimally moderated state.

Also disclosed is a method for designing a nuclear fission reactor that comprises: (a) specifying an initial reactor design; (b) specifying a fuel source design; (c) using the specified fuel source design and specified reactor design to determine an effective multiplication factor ($k_{eff}$) for an asymptotic core; and repeating (b) and (c) until an optimized fuel source design is developed that yields an asymptotic core with the highest value of the effective multiplication factor ($k_{eff}$).

If this maximum $k_{eff}$ is equal to one for the operational configuration of the reactor, then the design is complete. If this maximum $k_{eff}$ is either less or greater than one, then the reactor design specified in step (a) is modified and the process is repeated until a design is achieved for which the maximum $k_{eff}$ is one. By modifying the specified reactor design it is meant that one or more characteristics of the design are altered. As will be described in greater detail below, many design parameters can be modified to achieve a $k_{eff}$ of one. For example, the fuel travel velocity may be increased or decreased, or the height of fueled zone of the core (i.e., height of active core) is increased or decreased. Another example is for the size or the composition of the outer reflector between the core and the vessel or the size or composition of the inner reflector in the central region of the core to be altered. The effect of the reflectors design is important as these contribute to neutron moderation in the reactor. Means of modifying the design parameters are not limited to these examples, as is well known in the art. In scoping studies, if the maximum $k_{eff}$ is reasonably close to one without being exactly equal to one, the search for a configuration that yields exactly one may be dispensed with as additional features of the reactor design may be still not accounted for.

An optimally moderated fuel element for a nuclear fission reactor is also disclosed that comprises a fueled zone containing fuel and moderator and an unfueled zone containing only moderator. A moderator-to-fuel ratio of the fuel element is selected so that when the optimally moderated fuel source is used in a nuclear fission reactor, the nuclear fission reactor can be substantially continuously operated in an optimally moderated state.

DETAILED DESCRIPTION OF THE DRAWINGS

Illustrative and presently preferred embodiments of the invention are shown in the accompanying drawings in which.

DETAILED DESCRIPTION OF THE PREFERRED EMBODIMENTS

Figure 1:
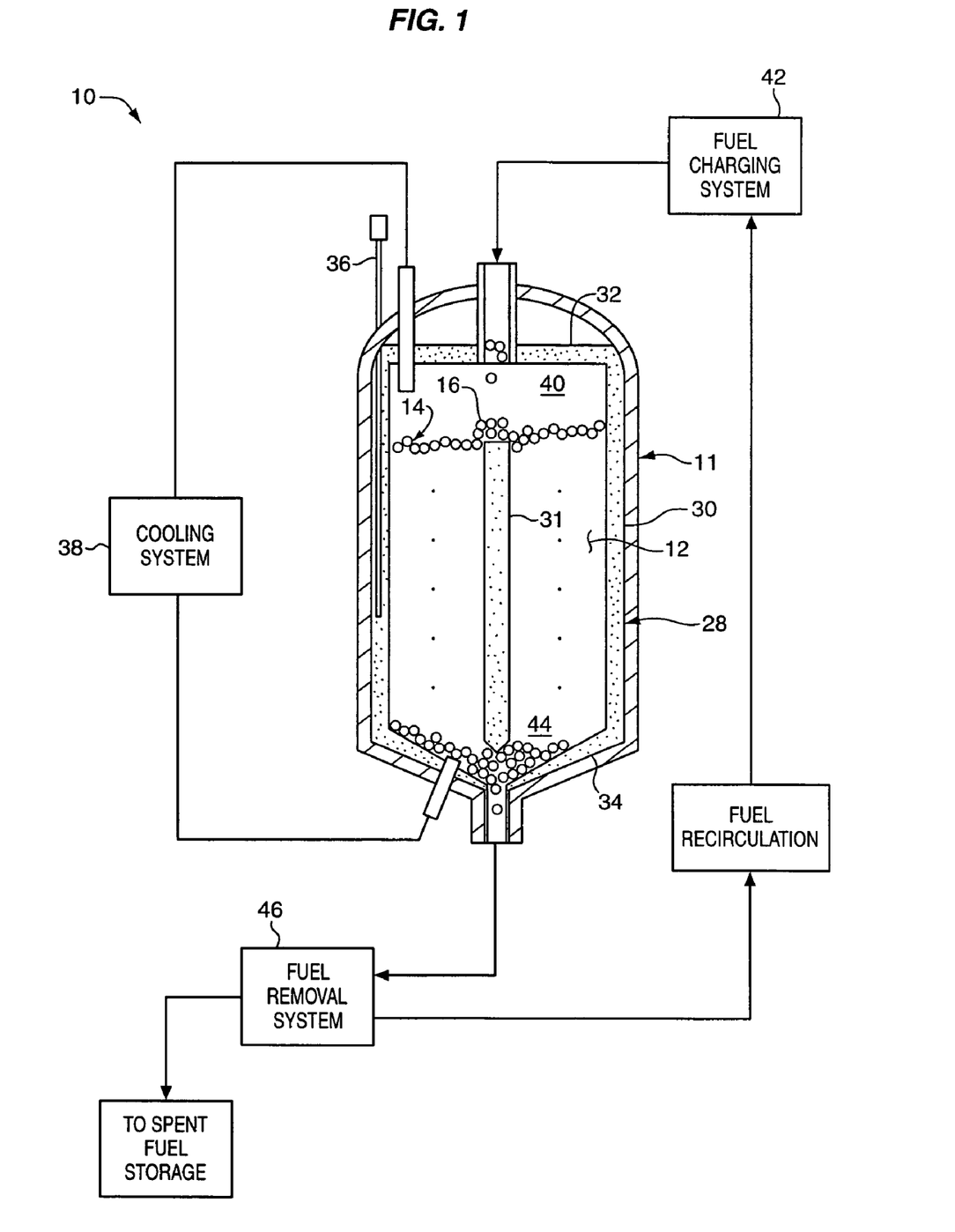
FIG. 1 is schematic representation of a optimally moderated nuclear fission reactor according to one embodiment of the present invention.

An optimally moderated nuclear fission reactor 10 according to one embodiment of the present invention is schematically illustrated in FIG. 1 and may comprise a vessel 11 containing a core 12 of optimally moderated fuel 14. The vessel 11 also contains a reflector 28. The reactor 10 is of the continuous fueling type, wherein new fuel (i.e., additional amounts of the optimally moderated fuel elements 14) is continuously introduced into the core 12 to replace depleted (or partially depleted) fuel 14 that is continuously removed from the core 12. As will be described in greater detail below, an optimally moderated fuel element 14 is a fuel source that yields, for a specified reactor configuration, an asymptotic core with the highest effective multiplication factor, $k_{eff}$. A final design for an optimally moderated reactor 10 is one in which the reactor configuration is specified and the maximum effective core multiplication factor, $k_{eff}$, attained using optimized fuel elements, is exactly equal to one (or within a specified tolerance of one). Stated another way, an optimally moderated reactor 10 is one in which the moderator-to-fuel ratio of the reactor 10 is selected so that the reactor 10 is optimally moderated for an asymptotic equilibrium state of the core 12, thereby allowing the nuclear fission reactor 10 to be substantially continuously operated in an optimally moderated state Referring now primarily to FIG. 2, each of the fuel elements 14 utilized in one embodiment of the invention may comprise a fuel pebble 16 having a fueled zone 18 surrounded by an unfueled zone 20. A method 22 (FIG. 3) of the present invention is utilized to design the optimized fuel element 14, as well as the final design for an optimally moderated reactor 10. In one embodiment, a radius 24 of an interface 26 between the fueled zone 18 and the unfueled zone 20 is varied until the method 22 confirms that the radius 24 is such that it results in the optimized fuel source 14, i.e., a fuel source 14 design that will result in an asymptotic core with the highest effective multiplication factor $k_{eff}$. Alternatively, and as will be described in greater detail below, other parameters of the fuel element 14 may be varied to maximize the effective multiplication factor $k_{eff}$.

Before proceeding with the description, it should be noted that the term "moderation" is used to describe the process by which neutrons created during the fission reaction are slowed down. Because slower neutrons are more efficient in creating subsequent fission events, the addition to the reactor of a moderator is typically required to sustain the nuclear chain reaction. Materials rich in hydrogen, such as water, are very effective as moderators, although other materials, particularly graphite, are also used. For example, graphite moderators are typically used in high-temperature gas-cooled reactors. The moderator-to-fuel ratio of a reactor is related to the degree of moderation of a reactor. An under-moderated reactor has a low moderator-to-fuel ratio, whereas an over-moderated reactor has a high moderator-to-fuel ratio.

It is highly preferable to operate a light-water nuclear reactor in an under-moderated state so that any physically plausible changes in moderation are self-correcting. That is, any changes in moderation tend to return the reactor to its original power level. For example, if the power increases, thus increasing the temperature of the core of a water-cooled reactor increases, the water, which acts as both a coolant and a moderator, will experience a decrease in density, thereby reducing the moderator-to-fuel ratio and decreasing the fission rate and hence decreasing the power. Conversely, if the core cools, the water density increases, increasing the moderator-to-fuel ratio and increasing the fission rate, thus increasing power and concomitantly the temperature. Therefore, events which lead to moderation changes in an under-moderated reactor are self-correcting. Unfortunately, however, operation of any reactor in the under-moderated state is less efficient than would otherwise be the case. The lower efficiency translates into a less-effective use of the fuel.

Light-water nuclear reactors could also be over-moderated, i.e., have a high moderator-to-fuel ratio. Generally speaking, it is not desirable to operate a nuclear reactor in an over-moderated state, in that changes in moderation are not self-correcting. That is, in an over-moderated reactor, the addition of moderator (resulting from an increase in density consequent to a drop in temperature) tends to decrease the fission rate via parasitic neutron absorption and hence would result in a further decrease in power and temperature. Similarly, decrease in moderator density will increase the fission rate (due to less parasitic neutron absorption) and would result in higher power and hence higher temperature and further decrease in moderator density thus leading to the possibility of a run-away power increase. Although the effects resulting from a change of moderation can be countered by other features of the reactor, it is usually a safety goal to avoid it altogether.

Continuing now with the description, the present invention recognizes that it is possible to operate a reactor of the continuously refueling type, such as a pebble bed reactor, in the optimally moderated state substantially continuously. This is in contrast to a reactor of the periodic fueling type which can only be optimally moderated for a particular instant in time, if at all. That is, the continuous burning of the fuel in the core of a periodic fueling reactor results in a gradually increasing moderator-to-fuel ratio. If the reactor is to be operated in the highly-desirable optimally-moderated state, it can only be operated in the optimal state at one instant in time wherein the steady burn-up of fuel causes the reactor to transition to the over-moderated state. However, because it is generally undesirable to operate the reactor in the over-moderated state, is it not feasible, from a practical or safety standpoint, to even reach the optimally moderated state.

Having briefly described the optimally moderated nuclear fission reactor systems and methods, as well as some of their more significant features and advantages, various exemplary embodiments of the system and method according to the present invention will now be described in detail. However, before proceeding with the description, it should be noted that the various embodiments shown and described herein are exemplary only and are not intended to represent the extent to which the present invention may be utilized. Indeed, the systems and methods described herein could be readily applied to any of a wide range of continuous fueling nuclear fission reactor designs, as would be obvious to persons having ordinary skill in the art after having become familiar with the teachings provided herein. Consequently, the present invention should not be regarded as limited to the particular pebble bed reactor and example configurations shown and described herein.

Referring back now to FIG. 1, one embodiment of an optimally moderated nuclear fission reactor 10 may comprise a vessel 11 enclosing a core 12 that comprises a plurality of fuel elements 14. The core 12 is surrounded by a graphite reflector 28 which, in one embodiment, comprises a generally cylindrically-shaped side reflector portion 30 that encircles the core 12. An inner reflector 31 may also be provided in certain reactor designs. The reflector 28 also comprises a top reflector portion 32 and a bottom reflector portion 34. As will be described in greater detail below, reflectors, such as reflector 28, are ordinarily constructed of moderating materials and their effects must be accounted for in the search for optimally moderated fuel element designs. The reactor 10 may also be provided with one or more control rod elements 36 for controlling the fission reaction occurring in the core 12. A cooling system 38 operatively associated with the reactor 10 provides a suitable coolant, such as helium (not shown), to the core 12 and reflector 28.

Because the reactor 10 is of the continuous fueling type, provisions are made to allow fresh fuel 14 (i.e., additional amounts of the optimized fuel source 14) to be added to the core 12 and to remove depleted (or partially depleted) fuel 14 from the core 12. In the embodiment shown and described herein, fresh fuel 14 is introduced to the top portion 40 of the core 12 by a fuel charging system 42. Depleted (or partially depleted) fuel 14 is removed from the bottom portion 44 of core 12 by gravity or by a fuel removal system 46. If the reactor 10 is to return partially depleted fuel 14 back to the top portion 40 of the core 12, then the reactor 10 may be provided with a suitable depletion detection system (not shown) for detecting when the fuel pebbles have become depleted to the extent where it is no longer desirable to recycle them. Partially depleted fuel 14 is recycled to the core 12, whereas depleted fuel 14 is removed from the recycle loop. Because continuous fueling reactor systems are well-known in the art and could be easily provided by persons having ordinary skill in the art after having become familiar with the teachings provided herein, the nuclear reactor system 10, as well as the various ancillary systems that may be desired or required for the operation of the nuclear reactor system 10, will not be described in further detail herein.

Figure 2:
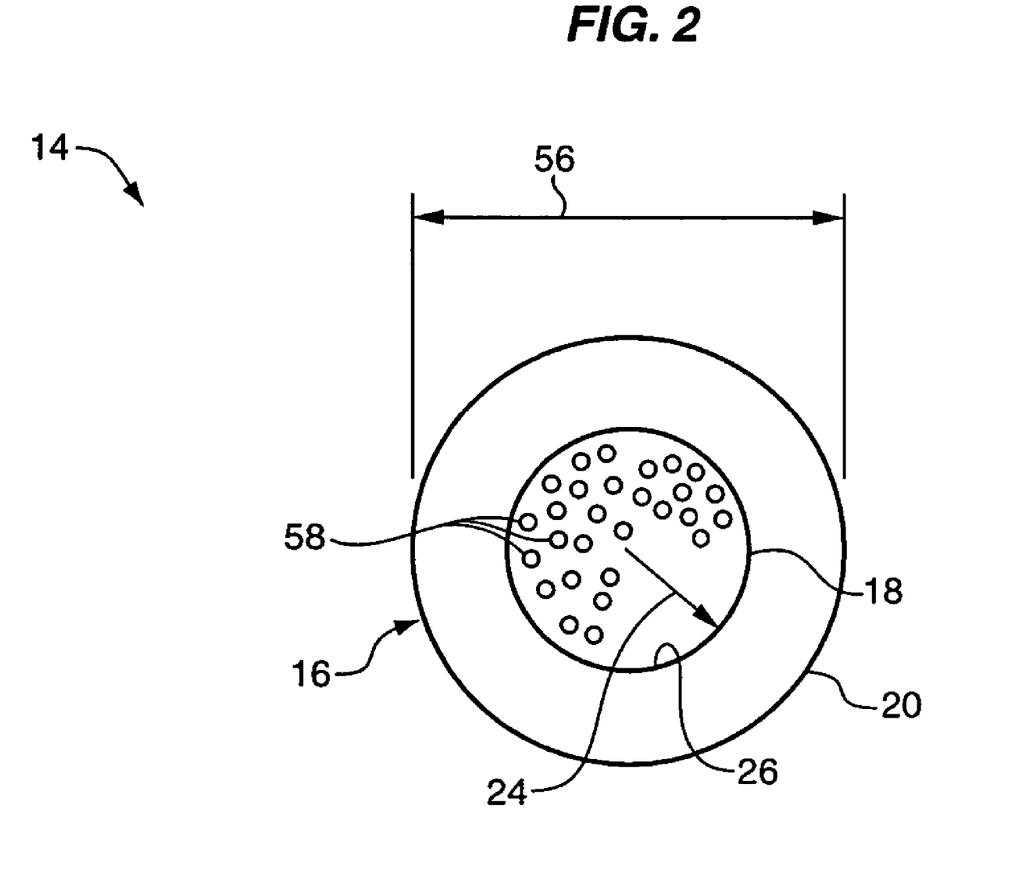
FIG. 2 is a sectional view of a fuel source pebble showing the fueled and unfueled zones.

As was briefly described above, the fuel source 14 in one embodiment is illustrated in FIG. 2 and may comprise a generally spherically-shaped fuel pebble 16 having an overall diameter 56 of about 6 cm. This overall diameter specification has become the current standard for fuel pebbles used in pebble bed reactors or proposed for use in future reactors. It is generally preferred, but not required, to provide the optimized fuel source 14 with this same overall diameter 56. This will allow the optimized fuel source 14 produced in accordance with the teachings provided herein to be used in currently-existing as well as planned designs of pebble bed reactors. Alternatively, fuel pebbles having different overall diameters 56 are possible and should be regarded as being within the scope of the present invention, provided suitable modifications are made to the reactor system to allow fuel pebbles having different overall diameters 56 to be used.

The fuel pebble 16 illustrated in FIG. 2 comprises a fueled region 18 surrounded by an unfueled region 20. The fueled region 18 comprises a plurality of individual fuel kernels 58 dispersed within a graphite matrix. In the embodiment shown and described herein, the individual fuel kernels 58 comprise "TRISO" fuel kernels. TRISO fuel kernels are well-known in the art and have also become the standard type of fuel kernel utilized in fuel pebbles of the type designed to be used in pebble bed reactors. However, other types of fuel kernels 58 now known in the art or that may be developed in the future may also be used with the present invention. For example, present or future kernel designs, including variations in size, composition and fissile and fertile contents that may become available are also possible and could be used. Consequently, the present invention should not be regarded as limited to the TRISO type of fuel kernels shown and described herein. By way of example, one embodiment of an optimized fuel source 14 may comprise a fueled zone 18 having in a range of about 9,800 to about 10,000 fuel kernels 58, although the fueled zone 18 may comprise a greater or lesser number of fuel kernels 58 depending on the particular design.

The unfueled region 20 of fuel pebble 16 substantially surrounds the fueled region 18 and meets the fueled region 18 at an interface 26. As mentioned above, the thickness of the unfueled region is selected so as to result in a fuel pebble 16 having an overall diameter 56 of about 6 cm, thereby making the overall size of the fuel pebble 16 comprising the optimized fuel source 14 substantially identical to the overall size of the "standard" fuel pebble used in conventional designs. In one embodiment, the unfueled region 20 comprises primarily graphite, which acts as a moderator. However, in alternative embodiments, other materials, such as hydrogen-containing or deuterium-containing materials (e.g., zirconium hydride—ZrH- or zirconium deuteride—ZrD), or beryllium-containing materials (e.g., beryllium proper or beryllium oxide), may also be present in the unfueled region 20. Such alternative embodiments will be described in further detail below. Such materials may also be present, intermixed in the graphite matrix of the fueled zone.

Figure 3:
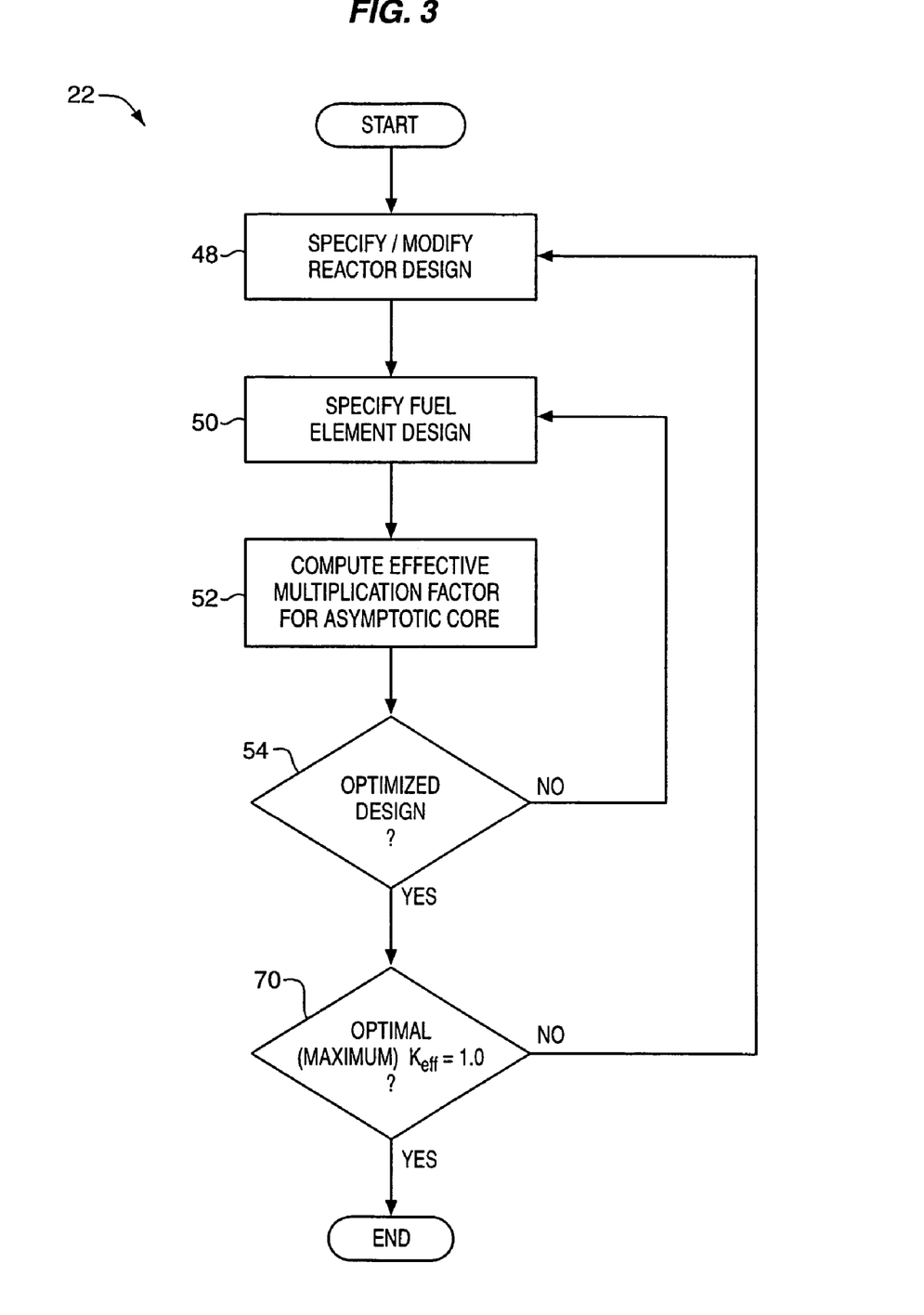
FIG. 3 is a flow chart of a method for designing an optimally moderated nuclear fission reactor according to one embodiment of the present invention.

With reference now primarily to FIG. 3, with occasional reference to FIG. 2, a method 22 for designing an optimally moderated fission reactor involves an iterative process in which reactor parameters are calculated for a specified reactor design and for a specified initial fuel source design. The fuel source design is then varied and the process repeated until an optimally moderated fuel source 14 (e.g., pebble 16) is found. As mentioned, an optimally moderated fuel source 14 is the one that, for a specified reactor design, yields an asymptotic core design with the highest (i.e., maximum) value of the effective multiplication factor, $k_{eff}$. A reactor core (e.g., core 12) provided with such an optimally moderated fuel source 14 is the optimally moderated core for the particular combination of fuel enrichment, moderator choice, core dimensions, and other specified reactor parameters. In short, then, optimal moderation in the context of the present invention is the condition in which either the addition or removal of moderating material will produce a decrease in the effective multiplication factor, $k_{eff}$. If the maximum $k_{eff}$ obtained thus far in this process is different from 1.0, then the reactor design, i.e. one or more or the reactor design parameters, is altered and the search process for the optimal pebble design is repeated. The design is finally optimal when the maximum $k_{eff}$ is one.

A first step 48 in the method 22 involves the initial specification of a reactor design. The reactor design involves the specification of several reactor parameters, including reactor shape (e.g., cylindrical), reactor size (e.g., physical dimensions), the presence or absence of reflectors, as well as the shape, location, and composition of the reflectors, the operating power level, refueling rate, fuel source re-circulation pattern, and burn-up cutoff for depleted fuel. Another rector design feature that may defined at this step is the type of fuel that is to used, both with regard to composition (fissile isotopes and fertile isotopes contents, as well as enrichments) and size of fuel kernels. These latter specifications would be omitted here if they are to be included in the degrees of freedom available in the fuel source design optimization step. The particular reactor parameters selected will depend to some extent on the particular methodology (i.e., computer program or "code") used to determine new reactor parameters in step 52, described below.

The next step 50 in the method 22 involves specifying a fuel source design. In the embodiment shown and described herein, certain parameters of the fuel source design are set to be invariant, while other parameters are varied as necessary to develop an optimized fuel source design 14. This is done to simplify the design process and to accommodate certain features of fuel source designs that are currently used in pebble bed reactor systems. However, it should be noted that an optimized fuel source 14 developed in accordance with the teachings provided herein should not be regarded as limited to any particular parameters remaining invariant. Indeed, any fuel source parameter that would affect the moderator-to-fuel ratio of the fuel source 14 (thus $k_{eff}$ of the asymptotic core) may be modified to achieve an optimized fuel source 14, as would be obvious to persons having ordinary skill in the art after having become familiar with the teachings of the present invention.

As mentioned above, certain parameters of the fuel source 14 are made invariant to simplify the design procedure. In the embodiment shown and described herein, the overall diameter 56 of the fuel pebble 16 is kept invariant to allow optimized fuel pebbles 14 to be used in existing and planned pebble bed reactor systems without modification to the reactor system. In addition, the design of the fuel kernels 58 is also made invariant and, in one embodiment, the fuel kernels 58 comprise TRISO type fuel kernels.

In the embodiment shown and described herein, one parameter of the fuel source 14 that is allowed to vary is the radius 24 of the interface 26 between the fueled region 18 and the unfueled region 20. See FIG. 2. Accordingly, the moderator-to-fuel ratio of the fuel source 14 (thus $k_{eff}$ of the asymptotic core fueled with the fuel source 14) may be varied by changing the radius 24 of the interface 26 between the fueled region 18 and the unfueled region 20. Another parameter of the fuel source 14 that may be varied to optimize the fuel source design is the number of fuel kernels 58 contained within the fueled region 18. Of course, the number of fuel kernels 58 contained within the fueled region 18 may also affect or change the moderator-to-fuel ratio of the fuel source 14. In still another embodiment, additional moderators, such as hydrogen, may be added to the fuel source 14, such as, for example, by adding a hydrogen-containing material to the unfueled region 20, or the fueled region 18, or to both.

In summation, then, because persons having ordinary skill in the art could readily select from one or several fuel source parameters that could be changed to achieve the optimally moderated fuel source design described herein, after having become familiar with the teachings of the present invention, the present invention should not be regarded as limited to varying any one or combination of the particular fuel source parameters described herein.

Once the reactor and fuel source designs have been specified in steps 48 and 50, respectively, the method 22 proceeds to step 52 (FIG. 3). Step 52 uses the reactor design and fuel source design to determine or compute the effective multiplication factor ($k_{eff}$) for an asymptotic core of the specified reactor design and fuel source design. As mentioned above, the optimized fuel source 14 is that fuel source 14 that yields the asymptotic core design with the highest value of the effective multiplication factor ($k_{eff}$). Typically, each different design of the fuel source 14 will result in a different $k_{eff}$ for the asymptotic core resulting from the combination of the reactor and fuel source designs. Accordingly, various parameters of the fuel source 14 may be varied (at step 50) and step 52 repeated until an optimized design is determined at step 54.

Still referring to FIG. 3, when the maximum effective multiplication factor ($k_{eff}$) for a given reactor configuration and for a specified set of reactor parameters is found, the maximum $k_{eff}$ is compared to one (i.e., 1.0), at step 70. A maximum $k_{eff}$ of 1.0 is required for exact criticality and normal reactor operation. This comparison is made within a pre-determined tolerance. This tolerance is typically a small to very small number (for example of the order of $10^{-2}$ to $10^{-6}$) depending on the stage of the design: very tight tolerance for a final design, substantially loose for initial scoping studies and initial reactor designs. If the maximum $k_{eff}$ is within the specified tolerance of 1.0, then the optimization process 22 is complete and the design is deemed optimally moderated. If the $k_{eff}$ is outside the specified tolerance, then the reactor design and reactor parameters are altered at step 48 (i.e., they are specified with some of the values changed from the previous guess) and the processes specified in steps 50, 52 and 54 are repeated.

Many design parameters can be modified to achieve a maximum $k_{eff}$ of 1.0 (or within the specified tolerance of 1.0), as would be readily apparent to persons having ordinary skill in the art after having become familiar with the teachings provided herein. For example, the fuel travel velocity may be increased or decreased, or the height of the fueled zone in the core (i.e., the height of the active core) may be increased or decreased. Another example of designs or parameters that may be changed are the size, shape, or composition of the outer reflector (e.g., portions 30, 32, and 34) between the core 12 and the vessel 11 or the size or composition of the inner reflector 31. As mentioned, the reflector design is important as the reflector contributes to the neutron moderation of the reactor. In preliminary or "scoping" studies, if the maximum $k_{eff}$ is reasonably close to 1.0 without being either exactly 1.0 or within the specified tolerance, the search for a configuration that yields exactly one may be dispensed with as additional features of the reactor design may be still not accounted for.

Figure 4:
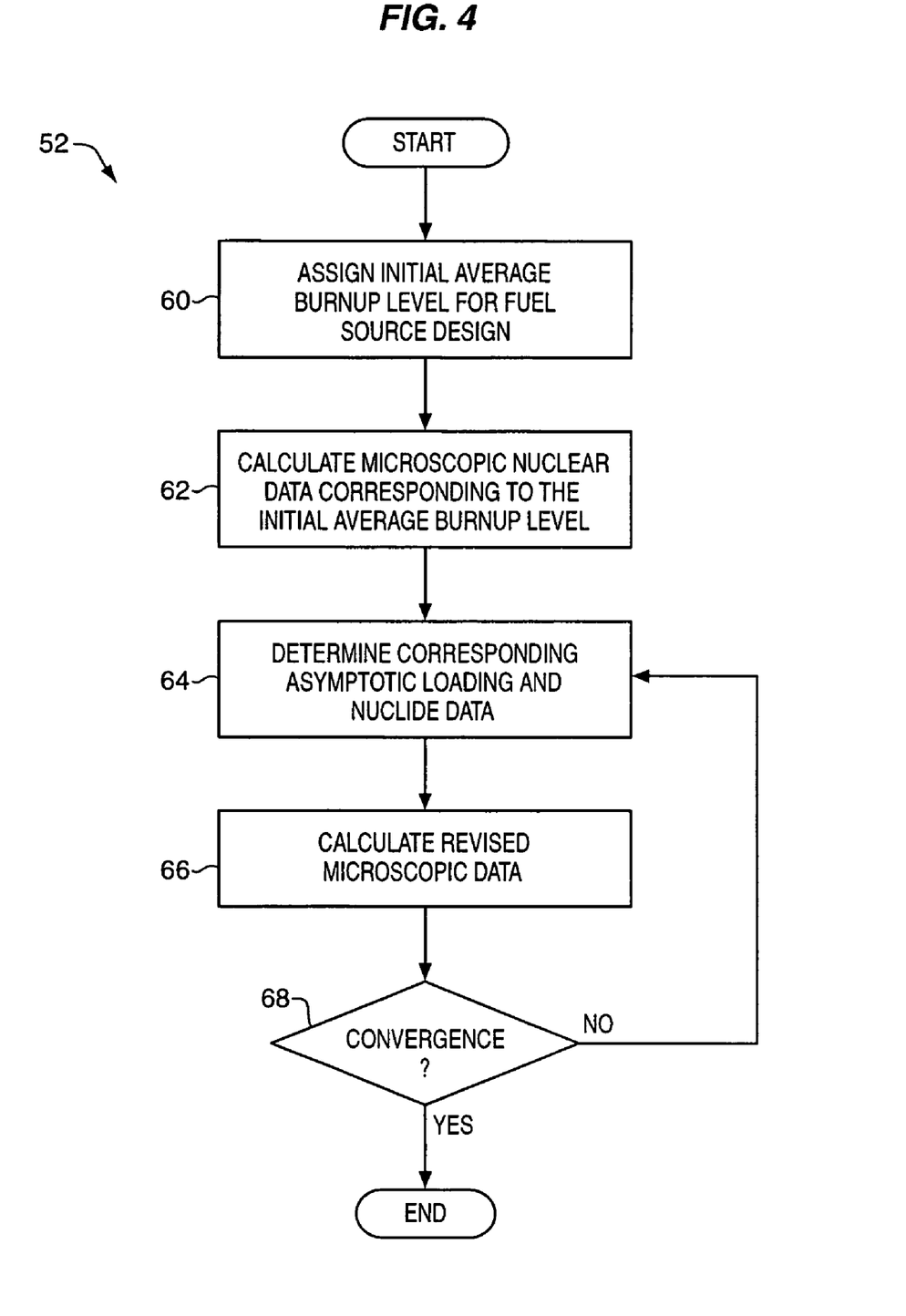
FIG. 4 is a flow chart of an iterative process for computing an effective multiplication factor for an asymptotic core.

Referring now to FIG. 4, the process 52 of determining the effective multiplication factor ($k_{eff}$) for each fuel source design 14 is itself an iterative process. In one approach, the determination of the effective multiplication factor ($k_{eff}$) for an asymptotic reactor core requires the availability of diffusion theory nuclear data that are compatible with the ultimately sought asymptotic state. That is, the neutron spectrum used in generating the data (i.e., multi-group cross-sections and diffusion coefficients) must be the neutron spectrum that would exist when the reactor core 12 is in the asymptotic state. However, that neutron spectrum is not known a priori, and therefore the corresponding nuclear data are not available. In another approach neutron transport theory can be used directly, however, though possible, it would be less practical to make it yield optimal results.

The step 52 of the present invention follows an iterative process in which microscopic nuclear data are generated for an initial assumption about an average burn-up level for the core. The microscopic data are then used to determine the corresponding asymptotic loading and burn-up pattern as well as the corresponding nuclide number densities and their respective distributions. The newly determined nuclide number densities are then used to re-compute microscopic data. This iterative process is repeated until convergence is achieved.

The first step 60 in the iterative process 52 is to assign or assume an initial average burn-up level for all the fuel present in the core 12, including re-circulated fuel elements 14, which have already sustained some burnup, as well as fresh fuel elements 14 of the fresh fuel source design. Corresponding microscopic nuclear data are then calculated or determined based on the initial average burn-up level that is estimated based on the expected performance of the reactor 10. In one embodiment, the corresponding microscopic nuclear data are calculated by using the MICROX-2 computer code, which is well-known in the art and available from the Radiation Safety Information Computational Center (RSICC) at the U.S. Department of Energy Oak Ridge National Laboratory.

Briefly, the MICROX-2 computer code is an integral transport theory code that evolved from an earlier version developed by General Atomics Corporation. The MICROX-2 code solves the "B1" neutron balance equations in a one-dimensional, two-region unit cell and produces the neutron spectrum that is used for cross-section collapsing. The two regions are coupled by collision probabilities based on spatially flat neutron fluxes. Dancoff factors and "bucklings" correct the one-dimensional cell calculations for multi-dimensional lattice effects. The MICROX-2 computer code prepares the broad-group neutron cross-sections for use in diffusion and transport codes. It can process up to eleven mixtures and a maximum of thirteen fission spectra for each spatial region. It has three geometry options: Spherical, cylindrical, and planar.

However, because the MICROX-2 computer code is well-known in the art and could be easily supplied and implemented by persons having ordinary skill in the art after having become familiar with the teachings of the present invention, the MICROX-2 computer code will not be described in further detail herein.

Alternatively, the microscopic data may be calculated by using the COMBINE computer code, which is also well-known in the art and available from the same RSICC source. Briefly, the COMBINE computer code solves the "B-1" or "B-3" approximation to the Boltzmann transport equation in one dimension for a homogeneous bare slab. The homogeneous region includes all of the materials in the fuel kernels 58, the carbon matrix, graphite shell, and surrounding coolant. An overall effective Dancoff factor, calculated as a function of fuel zone radius was used to account for the neighboring pebbles.

It should be noted that the COMBINE code is a full alternative to the MICROX-2 code. That is, both the COMBINE and MICROX-2 codes may be used to generate the data required for the methods described herein. In addition, other codes, either now existing or that may be developed in the future, could also be used to generate the required data. Therefore, the present invention should not be regarded as limited to use with only the particular computer codes described herein.

Regardless of the particular method or computer code that is used to calculate the microscopic nuclear data corresponding to the initial average burn-up level, step 64 uses the microscopic nuclear data to determine the corresponding asymptotic loading and burn-up pattern as well as corresponding nuclide data (e.g., nuclide number densities and their respective distributions). In one embodiment, these data are calculated using the PEBBED computer code (developed at the U.S. Department of Energy Idaho National Engineering and Environmental Laboratory—INEEL), which is well-known in the art and the methods of which has been published (e.g., in the journal entitled "Annals of Nuclear Energy"). The methods embodied in the PEBBED code are widely available and disclosed in a way that enables persons versed in the art to reproduce the PEBBED functionality without undue experimentation.

Briefly, the PEBBED computer code is used for self-consistent analysis of neutron flux and isotopic depletion and buildup in a pebble bed reactor with a flowing core. The PEBBED code can treat arbitrary pebble re-circulation schemes and allows more than one type of pebble to be specified. Output data from the PEBBED code includes the spatial distribution of the burn-up and of the principal nuclides throughout the reactor core and in the discharged pebbles. The PEBBED computer code also allows the estimation of refueling needs and predicts power production.

Here again, because the PEBBED computer code is known in the art and the methods embodied therein could be easily utilized by persons having ordinary skill in the art after having become familiar with the teachings of the present invention, the PEBBED computer code will not be described in further detail herein.

The nuclide data from step 64, e.g., the data from the PEBBED computer code, are then used at step 66 to calculate or determine revised microscopic data. In step 66, the revised microscopic data may be determined or calculated in accordance with step 62, e.g., using either MICROX-2 or COMBINE, or functionally similar, computer codes. Steps 64 and 66 are then repeated until convergence is determined at step 68. When convergence occurs, the data from step 52 will include the effective multiplication factor ($k_{eff}$) for the asymptotic core and fuel source design.

As mentioned above, any of a wide range of fuel source parameters may be changed or varied in the iterative process of method 22. In one embodiment, the radius 24 of the interface 26 between the fueled region 18 and the unfueled region 20 is varied. By way of example, optimized fuel sources 14 according to one embodiment of the present invention may have fuel zone radii in the range of about 2.3 to about 2.4 cm. Assuming the same kernel packing fraction for the fueled zone, these fuel zone radius numbers correspond to a kernel loading in a range of about 9,800 to about 10,000 fuel kernels per pebble. Alternatively, other fuel source parameters may be changed, as described herein. For example, the number of fuel kernels provided to the fueled region 18 may be varied, thus altering the fuel-to-moderator ratio of the fuel element 14. Similarly, the amount and type of moderator provided to the fueled region 18 and/or the unfueled region 20 may also be varied to achieve optimized fuel source design. Still other parameters, or combinations of parameters, of the fuel element 14 may be varied to maximize the effective multiplication factor keff, as would be readily apparent to persons having ordinary skill in the art after having become familiar with the teachings of the present invention. Therefore, the present invention should not be regarded as limited to any particular fuel source parameter or combination of fuel source parameters.

For each design variation of the fuel source 14, step 52 (FIG. 3) is performed to derive the effective multiplication factor ($k_{eff}$) for an asymptotic core containing the fuel source 14. The optimal fuel source design will be that design having the highest or maximum $k_{eff}$. However, other fuel source parameters may be changed or varied as well, with step 52 being performed for each different fuel source design. The optimized fuel source design will be that design (i.e. combination of parameters) that results in the maximum $k_{eff}$ for the asymptotic core.

Once an optimally moderated core design is obtained, its properties may be studied via further models. For example, the response of the core to water ingress may be investigated by assuming the gradual addition of water vapor into the coolant (or the gradual substitution of water vapor for portions of the coolant). The process starts with an evaluation of the nuclear data (e.g., using the MICROX-2 computer code). Input to this evaluation are the nuclide number densities of the optimally moderated asymptotic core augmented with the relevant concentration of water vapor in the coolant. The resulting nuclear data may then be used in a criticality calculation. This process may be repeated as necessary for increased water inventory in the core region.

EXAMPLES

The method 22 described herein was used to determine the optimal design for several different reactor configurations. First and second examples are presented which illustrate the respective $k_{eff}$ values associated with various fuel source configurations for the two different reactor configurations. In a comparative example (Example 3), the present invention was used to develop an optimized fuel source for an actual reactor configuration. The various operational parameters of the reactor utilizing the non-optimized (i.e., "conventional" fuel pebbles) are then compared with those when the reactor would be fueled with the optimized fuel source 14.

Examples 1 and 2

Examples 1 and 2 involve the search for an optimized fuel source for two pebble bed reactors of different power. A first reactor design, having a thermal power output of 300 MW$_{th}$, was selected. Fuel source pebbles 16 (FIG. 2) having various fuel elements radii were analyzed and the effective multiplication factors they respectively result in are determined. A plot of $k_{eff}$ versus fuel zone radius (in cm) for the 300 MW$_{th}$ reactor is presented in FIG. 5. A second reactor design, having a thermal power output of 600 MW$_{th}$, was also analyzed. Fuel source pebbles having various fuel source radii were analyzed for the second reactor design and their respective effective multiplication factors determined. The effective multiplication factors ($k_{eff}$) for the various fuel zone radii are also presented in FIG. 5. The parameters for the 300 MW$_{th}$ reactor design are presented in Table 1:

TABLE 1

| VHTR 300 Core Model | |
|---|---|
| Core Geometry | |
| Inner reflector | radius = 40 cm, height = 875 cm |
| Core (pebble-bed) | radius = 175 cm, height = 875 cm |
| Top reflector | radius = 225 cm, height = 140 cm |
| Radial reflector | width = 75 cm, height = 875 cm |

TABLE 1-continued

| | |
|---|---|
| Bottom reflector | radius = 225 cm, height = 260 cm |
| Gas plenum between core and top reflector | height = 50 cm |
| Pebble Flow | |
| Pebble packing fraction | 0.613 |
| Mean pebble flow rate (pebbles/day) | 5599 |
| Normalized axial velocity profile $v_z(r)$ ($v_o$ = velocity at inner flow boundary) | $v(r) = v_o(-2.302E{-}5r^2 + 2.750E{-}3r + 1)$ |
| Number of flow channels | 5 |
| Outer radii of flow channels (cm) | 75.5 96.8 132.4 153.7 175.0 |
| Number of flow zones | 1 |
| Pebble Data | |
| Ex-Core Decay Time | |
| Composition (see below) | FUEL |
| Discharge burnup (MWD/kg$_{ihm}$) | 93.9 |
| Ex-core decay time (hours) | 40 |
| Recirculation mode | Random (1 flow zone) |
| Nuclear Data | |
| Energy Group | Max. Energy (eV) |
| 1 | 1.6905E7 |
| 2 | 1.1109E5 |
| 3 | 7102. |
| 4 | 29.023 |
| 5 | 2.3823 |
| 6 | 1.8554 |
| Fuel isotopes (that produce fission products) | U-235, Pu-239, Pu-241 |
| Depletion chains | |
| U-235 | U-235 U-236 U-237 Np-237 Np238 Pu-238 Pu-239 |
| U-238 | U-238 Np-239 Pu-239 Pu-240 Pu-241 Pu-242 |
| Xe | I-135 Xe-135 |
| Sm | Pm-149 Sm-149 |
| Composition Specification | BOL Homogenized Atom Density (atoms/barn-cm) |
| FUEL isotopes | |
| C-12 | 0.05300 |
| U-235 | 8.845E−06 |
| U-238 | 1.004E−04 |
| O-16 | 2.186E−4 |
| Si-28 | 2.389E−4 |
| He-4 | 1.964-4 |
| REFLECTOR isotopes | |
| C-12 | 0.07671 |
| VOID isotopes | |
| He-4 | 5.076E−04 |
| Thermal-Hydraulic Data | |
| Core power (MWth) | 300 |
| Helium temperature (° C.) - inlet/outlet | 600/1,000 |
| He flow rate (kg/s) | 144.4 |
| He specific heat (J/kg-K) | 5196 |
| He inlet pressure (Mpa) | 7.0 |

| Depressurized Conduction Cooldown Model | | | |
|---|---|---|---|
| Region | Composition | Outer Radius (cm) | Density (g/cm$^3$) |
| 1 | Reflector (inner) | 40 | 1.8 |
| 2 | Pebble-bed | 175 | 1.10 |
| 3 | Reflector | 251 | 1.8 |
| 4 | Void (He) | 281 | 0.0 |
| 5 | Reflector (core barrel) | 284 | 1.8 |

TABLE 1-continued

| | | | |
|---|---|---|---|
| 6 | Void (He) | 291 | 0.0 |
| 7 | 2.25Cr—1Mo Steel | 301 | 7.675 |
| 8 | Void (He) | 428 | 0.0 |
| Outer boundary temperature (° C.) | | 35 | |
| Mean reflector fluence (n/cm$^2$) | | 0 | |

The parameters for the 600 MW$_{th}$ are presented in Table 2:

TABLE 2

VHTR 600 Core Parameters

Core Geometry

| | |
|---|---|
| Inner reflector | radius = 150 cm, height = 950 cm |
| Core (pebble-bed) | radius = 250 cm, height = 950 cm |
| Top reflector | radius = 326 cm, height = 140 cm |
| Radial reflector | width = 76 cm, height = 950 cm |
| Bottom reflector | radius = 326 cm, height = 260 cm |
| Gas plenum between core and top reflector | height = 50 cm |

Pebble Flow

| | |
|---|---|
| Pebble packing fraction | 0.613 |
| Mean pebble flow rate (pebbles/day) | 8314 |
| Normalized axial velocity profile v$_z$(r) (v$_o$ = velocity at inner flow boundary) | v(r) = v$_o$(−2.302E−5r$^2$ + 2.750E−3r + 1) |
| Number of flow channels | 5 |
| Outer radii of flow channels (cm) | 171.1 192.1 213.2 234.2 250.0 |
| Number of flow zones | 1 |

Pebble Data
Ex-Core Decay Time

| | |
|---|---|
| Composition (see below) | FUEL |
| Discharge burnup (MWD/kg$_{ihm}$) | 80.0 |
| Ex-core decay time (hours) | 5 |
| Recirculation mode | Random (1 flow zone) |

Nuclear Data

| Energy Group | Max. Energy (eV) |
|---|---|
| 1 | 1.6905E7 |
| 2 | 1.1109E5 |
| 3 | 7102. |
| 4 | 29.023 |
| 5 | 2.3823 |
| 6 | 1.8554 |
| Fuel isotopes (that produce fission products) | U-235, Pu-239, Pu-241 |
| Depletion chains | |
| U-235 | U-235 U-236 U-237 Np-237 Np238 Pu-238 Pu-239 |
| U-238 | U-238 Np-239 Pu-239 Pu-240 Pu-241 Pu-242 |
| Xe | I-135 Xe-135 |
| Sm | Pm-149 Sm-149 |

| Composition Specification | BOL Homogenized Atom Density (atoms/barn-cm) |
|---|---|
| FUEL isotopes | |
| C-12 | 0.05300 |
| U-235 | 8.735E−06 |
| U-238 | 9.919E−05 |
| O-16 | 2.158E−4 |
| Si-28 | 2.359E−4 |
| He-4 | 1.964-4 |
| REFLECTOR isotopes | |
| C-12 | 0.07671 |

TABLE 2-continued

| | |
|---|---|
| VOID isotopes | |
| He-4 | 5.076E−04 |
| Thermal-Hydraulic Data | |
| Core power (MWth) | 600 |
| Helium temperature (° C.) - inlet/outlet | 600/1,000 |
| He flow rate (kg/s) | 288.4 |
| He specific heat (J/kg-K) | 5,196 |
| He inlet pressure (Mpa) | 7.0 |

Depressurized Conduction Cooldown Model

| Region | Composition | Outer Radius (cm) | Density (g/cm$^3$) |
|---|---|---|---|
| 1 | Reflector (inner) | 150 | 1.8 |
| 2 | Pebble-bed | 250 | 1.10 |
| 3 | Reflector | 326 | 1.8 |
| 4 | Void (He) | 356 | 0.0 |
| 5 | Reflector (core barrel) | 360 | 1.8 |
| 6 | Void (He) | 366 | 0.0 |
| 7 | 2.25Cr—1Mo Steel | 376 | 7.675 |
| 8 | Void (He) | 503 | 0.0 |
| Outer boundary temperature (° C.) | | 35 | |
| Mean reflector fluence (n/cm$^2$) | | 0 | |

Figure 5:
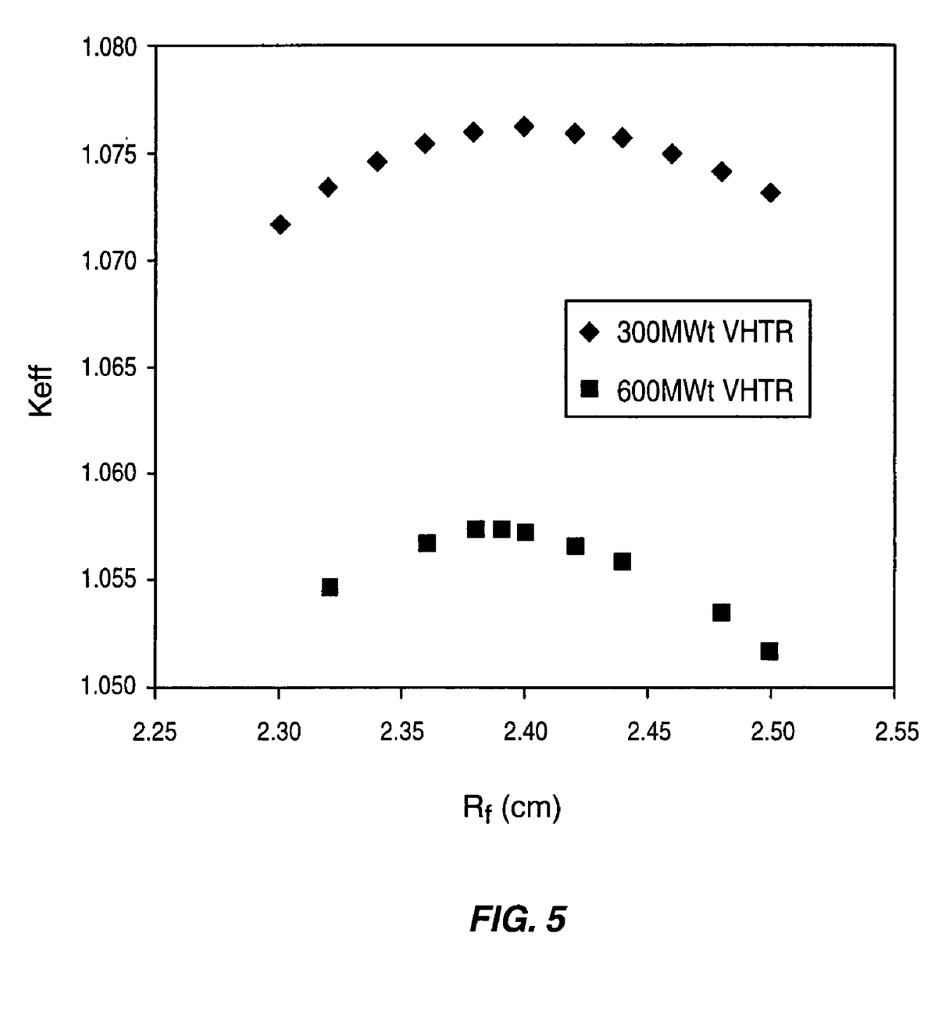
FIG. 5 is a plot of effective multiplication factors for various fuel zone radii for typical initial reactor designs (prior to obtaining a configuration with $k_{eff}$ exactly equal to one) of two different power levels.

With reference to FIG. 5, the 300 MW$_{th}$ design displays a peak (i.e., maximum) k$_{eff}$, optimal moderation, at a fuel zone radius of 2.4 cm. The 600 MW$_{th}$ reactor design is optimal with a fuel zone radius of 2.39 cm. Assuming the same kernel packing fraction for the fueled zones in each optimized fuel source, the fuel zone radius numbers correspond to a kernel loading of about 9971 kernels per pebble for the 300 MW$_{th}$ core and 9847 kernels per pebble for the 600 MW$_{th}$ design. Because each point in FIG. 5 corresponds to an asymptotic equilibrium pattern, the optimally moderated fuel source allows the nuclear fission reactor to be substantially continuously operated in an optimally moderated state.

The outer loop of FIG. 3 (i.e., step 70) corresponding to a search for reactor design giving a maximum k$_{eff}$ exactly equal to one was dispensed with in this scoping study because the intent was only preliminary designs and absorber impurities in the moderator and partially inserted control elements (i.e. rods) were omitted. The excess reactivity retained in the computed maximum k$_{eff}$ values is of the same order as that held down by impurities and partly inserted control rods for power shaping purposes. This omission is immaterial with respect to the claims of this invention. However, the optimal pebble design might be slightly altered. The optimal pebble design is expected to be final reactor design-dependent.

Figure 6:
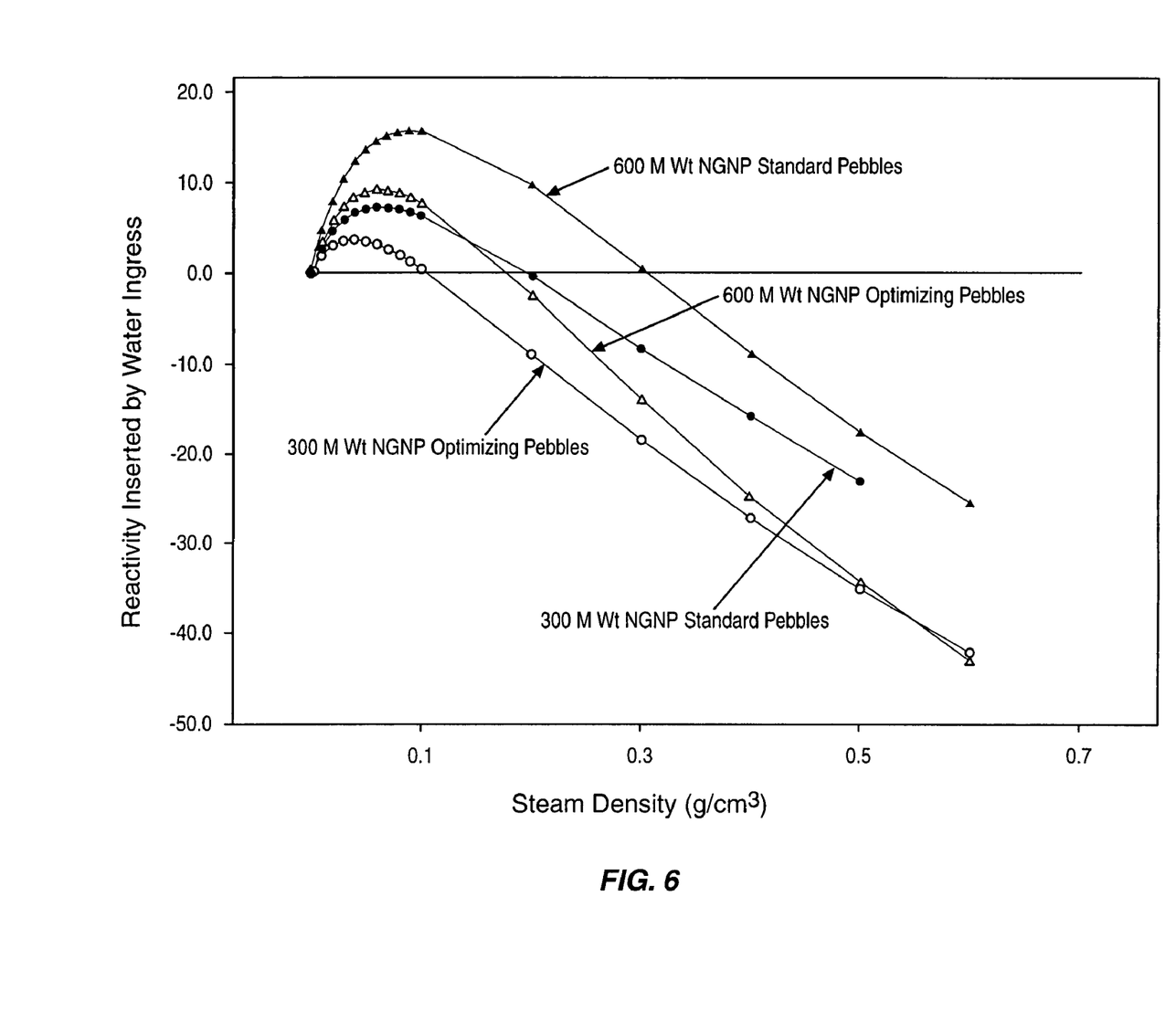
FIG. 6 is a plot of core reactivity versus water ingress for reactors of two different power levels fueled with both standard fuel pebbles and optimized fuel pebbles according to the teachings of the present invention.

Water ingress calculations were then performed for each reactor design (i.e., 300 MW$_{th}$ and 600 MW$_{th}$) using both the optimized fuel source for each reactor design (e.g., 2.4 cm fueled zone radius and 2.39 cm fueled zone radius, respectively) as well as the standard fuel source (e.g., 2.5 cm fueled zone radius). The calculations were performed using the PEBBED computer code in conjunction with diffusion theory data generated by the MICROX-2 computer code. The iteration processes described herein were utilized. FIG. 6 illustrates the effect of water ingress into the helium coolant for both reactor designs. For both reactor designs, the optimized fuel source clearly demonstrates a decreased reactivity insertion compared to the standard pebble bed reactor fuel. The 600 MW$_{th}$ core indicates a greater susceptibility to reactivity excursions compared to the 300 MW$_{th}$ core. Peak reactivity insertions are presented in Table 3:

TABLE 3

| Reactor/Fuel Source (g/cm³) | Peak Insertion ($) | Water Density |
|---|---|---|
| 300 MW$_{th}$ - Standard Fuel | 7.05 | 0.06 |
| 300 MW$_{th}$ - Optimized Fuel | 3.57 | 0.04 |
| 600 MW$_{th}$ - Standard Fuel | 15.53 | 0.09 |
| 600 MW$_{th}$ - Optimized Fuel | 9.24 | 0.06 |

The peak reactivity insertions from water ingress for the optimized fuel source are roughly half as great as those for the standard fuel source.

Example 3

A pebble bed reactor was modeled having a cylindrically shaped core with a height of 10 m, a diameter of 3 m, a graphite reflector all around with a 1 m gap between the top of the core and the top reflector. Various modeled reactor performance data are presented below for the "conventional" design and for the "optimal" design having an optimal fuel source designed in accordance with the teachings herein. The fuel source of the conventional design comprised a conventional fuel pebble having an overall diameter of 6 cm and a fueled zone radius of 2.5 cm. The optimized fuel source was determined for this case to have a fueled zone radius of 2.33 cm.

TABLE 4

| Parameter | Conventional | | Optimized | |
|---|---|---|---|---|
| Fueled zone radius (cm) | 2.5 | | 2.33 | |
| k$_{eff}$ | 1.045 | | 1.056 | |
| Discharge burn-up (MWd/kg$_{hm}$) | 80 | | 93.9 | |
| HM Loading (g) | 9.086 | | 7.285 | |
| Kernels per pebble | 15,000 | | 12,143 | |
| Pebble Injection Rate (pb/day) | 372 | | 438 | |
| Passes per Pebble | 10 | | 11 | |
| Residence Time (days) | 875 | | 954 | |
| Discharge Concentration (g/day) | | Δ | | Δ |
| U-235 | 60 | −208 | 36 | −219 |
| U-238 | 2896 | −183 | 2731 | −205 |
| Pu-239 | 25 | −25 | 21 | −21 |
| Pu-240 | 22 | −22 | 21 | −21 |
| Pu-241 | 10 | −10 | 10 | −10 |
| Pu-242 | 6 | −6 | 9 | −9 |
| Fuel Utilization (g/MWd) | | −1.22 | | −1.21 |
| HM Mass Daily Throughput (g/day) | 3380 | | 3191 | |
| HM Mass Daily Throughput (g/MWd) | 12.6 | | 10.6 | |
| Particles/Mwday | 20821 | | 17729 | |

As can be seen from the results presented in Table 4, the fuel utilization (i.e., throughput) per unit of energy produced is improved by about 20% in the optimized design compared with the conventional design (e.g., 17729 fuel particles per MWd for the optimized design vs. 20821 fuel particles per MWd for the conventional design).

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. In a continuous fueling nuclear fission reactor, the improvement comprising:
   determining an asymptotic core for the nuclear fission reactor; and
   providing the nuclear fission reactor with a moderator-to-fuel ratio that is optimally moderated for the asymptotic core of the nuclear fission reactor, the moderator-to-fuel ratio allowing said nuclear fission reactor to be substantially continuously operated in an optimally moderated state.

2. The nuclear fission reactor of claim 1, wherein providing the nuclear fission reactor with a moderator-to-fuel ratio that is optimally moderated for the asymptotic core of the nuclear fission reactor comprises providing a fuel source that is optimally moderated for the asymptotic core of the nuclear fission reactor.

3. The nuclear fission reactor of claim 2, wherein providing a fuel source comprises providing a fuel source with a graphite moderator, said graphite moderator being present in an amount sufficient to allow said nuclear fission reactor to be substantially continuously operated in an optimally moderated state.

4. The nuclear fission reactor of claim 2, wherein providing a fuel source comprises providing a fuel source with a moderator selected from the group consisting of graphite, hydrogen, deuterium, and beryllium, said moderator being present in an amount sufficient to allow said nuclear fission reactor to be substantially continuously operated in an optimally moderated state.

5. A method for designing a continuous fueling nuclear fission reactor, comprising:
   a) specifying a continuous fueling reactor design, the reactor design including reactor parameters;
   b) specifying a fuel source design for a fuel source comprising a fuel pebble having a fueled zone and an unfueled zone, wherein specifying a fuel source design comprises determining a radius of an interface between the fueled zone and the unfueled zone of the fuel pebble comprising the fuel source;
   c) using the specified fuel source design and specified reactor design to determine an effective multiplication factor (k$_{eff}$) for an asymptotic core; and
   d) repeating (b) and (c) until an optimized fuel source design is developed that yields an asymptotic core with the highest value of the effective multiplication factor (k$_{eff}$); and
   e) selecting the optimized fuel source design as a fuel source to be used in the continuous fueling nuclear fission reactor so that the continuous fueling nuclear fission reactor can be substantially continuously operated in an optimally moderated state.

6. The method of claim 5, further comprising: verifying that the highest value of the effective multiplication factor (k$_{eff}$) is equal to 1.0 within a specified tolerance; and if the highest value of the effective multiplication factor (k$_{eff}$) is not about equal to one within said specified tolerance, repeating (a), (b), and (c) until the maximum value of the effective multiplication factor (k$_{eff}$) equal to 1.0 within said specified tolerance.

7. The method of claim 5, wherein determining the radius of the interface between the fueled zone and the unfueled zone establishes a number of fuel kernels to be provided in the fueled zone of the fuel pebble.

8. The method of claim 7, wherein the number of fuel kernels in the fueled zone is in a range of about 9,800 to about 10,000 fuel kernels.

9. The method of claim 5, wherein the radius of the interface between the fueled zone and the unfueled zone is in the range of about 2.3 to about 2.4 cm.

10. The method of claim 9, wherein the radius of the interface between the fueled zone and the unfueled zone is about 2.33 cm.

11. The method of claim 9, wherein the radius of the interface between the fueled zone and the unfueled zone is about 2.4 cm.

12. The method of claim 5, wherein said fuel source comprises a fuel pebble having a plurality of fuel kernels provided therein, and wherein determining a fuel source design comprises determining a number of said plurality of fuel kernels to be provided to said fuel pebble.

13. The method of claim 5, wherein said fuel source comprises a moderator, and wherein determining a fuel source design comprises determining an amount of moderator to be provided to said fuel source.

14. The method of claim 5, wherein said fuel source comprises a moderator, and wherein determining a fuel source design comprises determining a composition of moderator to be provided to said fuel source.

15. The method of claim 5, wherein the reactor parameters comprise one or more reactor parameters selected from the group consisting of reactor shape, reactor size, presence of reflectors, location of reflectors, composition of reflectors, size of reflectors, operating power level, refueling rate, fuel source re-circulation pattern, and burn-up cutoff for spent fuel.

16. The method of claim 5, wherein (c) comprises using PEBBED computer code or another code embodying the methods of the PEBBED code.

17. The method of claim 16, further comprising using COMBINE computer code in conjunction with the PEBBED code in an iterative process to determine the effective multiplication factor ($k_{eff}$) for the asymptotic core.

18. The method of claim 5, wherein (c) comprises:
   i) assigning an initial average burn-up level for the fuel source design;
   ii) calculating microscopic nuclear data corresponding to the initial average burn-up level;
   iii) using the microscopic nuclear data to determine corresponding nuclide data;
   iv) using the corresponding nuclide data to calculate revised microscopic nuclear data; and
   v) repeating (iii) and (iv) until the nuclide data converge.

19. The method of claim 18, further comprising repeating (iii) and (iv) until the microscopic nuclear data converge.

20. The method of claim 18, wherein said nuclide data comprise a nuclide number density and a nuclide distribution.

21. The method of claim 18, wherein (iii) further comprises using the microscopic nuclear data to determine a corresponding asymptotic loading and burn-up pattern.

22. A method for designing a continuous fueling nuclear fission reactor, comprising:
   a) specifying a continuous fueling reactor design;
   b) specifying a fuel source design for a fuel source comprising a fuel pebble having a fueled zone and an unfueled zone, wherein specifying a fuel source design comprises determining a radius of an interface between the fueled zone and the unfueled zone of the fuel pebble comprising the fuel source;
   c) using the specified reactor design and the specified fuel source design to determine a $k_{eff}$ for the fuel source design;
   d) repeating (b) and (c) until an optimized fuel source design is developed having a $k_{eff}$ that is about a maximum for the specified reactor design;
   e) verifying that the maximum value of $k_{eff}$ is equal to one within a specified tolerance and if not equal to one within said tolerance, modifying the design specified in (a) and repeating (b), (c) and (d) until the maximum value of $k_{eff}$ is one within the specified tolerance; and
   f) selecting as an optimal fuel source design the fuel source design having the $k_{eff}$ that is about a maximum, the optimal fuel source design allowing said continuous fueling nuclear fission reactor to be substantially continuously operated in an optimally moderated state.

23. The method of claim 22, wherein determining the radius of the interface between the fueled zone and the unfueled zone establishes a number of fuel kernels to be provided in the fueled zone of the fuel pebble.

24. The method of claim 23, wherein the number of fuel kernels in the fueled zone is in a range of about 9,800 to about 10,000 fuel kernels.

25. The method of claim 22, wherein the radius of the interface between the fueled zone and the unfueled zone is in the range of about 2.3 to about 2.4 cm.

26. The method of claim 22 further comprising using PEBBED computer code in determining the $k_{eff}$ for the fuel source design.

27. The method of claim 26, further comprising using COMBINE computer code in conjunction with the PEBBED code in an iterative process to determine the $k_{eff}$ for the fuel source design.

28. The method of claim 22, wherein specifying an initial reactor design comprises specifying parameters selected from the group consisting of reactor shape, reactor size, presence of reflectors, location of reflectors, operating power level, refueling rate, fuel source re-circulation pattern, and burn-up cutoff for spent fuel.

29. A method for designing a continuous fueling nuclear fission reactor, comprising:
   a) specifying a continuous fueling reactor design, the reactor design including reactor parameters;
   b) specifying a fuel source design;
   c) using the specified fuel source design and specified reactor design to determine an effective multiplication factor ($k_{eff}$) for an asymptotic core; and
   d) repeating (b) and (c) until an optimized fuel source design is developed that yields an asymptotic core with the highest value of the effective multiplication factor ($k_{eff}$); and
   e) selecting the optimized fuel source design as a fuel source to be used in the continuous fueling nuclear fission reactor so that the continuous fueling nuclear fission reactor can be substantially continuously operated in an optimally moderated state.

30. A method for designing a continuous fueling nuclear fission reactor, comprising:
   a) specifying a continuous fueling reactor design;
   b) specifying a fuel source design;
   c) using the specified reactor design and the specified fuel source design to determine a $k_{eff}$ for the fuel source design;
   d) repeating (b) and (c) until an optimized fuel source design is developed having a $k_{eff}$ that is about a maximum for the specified reactor design;
   e) verifying that the maximum value of $k_{eff}$ is equal to one within a specified tolerance and if not equal to one within said tolerance, modifying the design specified in (a) and repeating (b), (c) and (d) until the maximum value of $k_{eff}$ is one within the specified tolerance; and
   f) selecting as an optimal fuel source design the fuel source design having the $k_{eff}$ that is about a maximum, the optimal fuel source design allowing said continuous fueling nuclear fission reactor to be substantially continuously operated in an optimally moderated state.

* * * * *